United States Patent [19]

Loy

[11] Patent Number: 4,639,082
[45] Date of Patent: Jan. 27, 1987

[54] COLLIMATOR FOR COORDINATING TWO OPTICAL DEVICES

[75] Inventor: Fernand R. Loy, Sceaux, France

[73] Assignee: U.S. Philips Corporation, New York, N.Y.

[21] Appl. No.: 716,890

[22] Filed: Mar. 27, 1985

[30] Foreign Application Priority Data

Apr. 17, 1984 [FR] France .................. 84 06057

[51] Int. Cl.⁴ .................... G02B 27/14; G02B 5/08
[52] U.S. Cl. .......................... 350/172; 350/171; 350/602; 350/622; 356/138
[58] Field of Search ............... 350/602, 622, 618, 171, 350/172, 169, 1.1; 356/138, 153, 399

[56] References Cited

U.S. PATENT DOCUMENTS

| | | | |
|---|---|---|---|
| 2,573,703 | 11/1951 | Gardner | 356/138 |
| 3,302,511 | 2/1967 | Baker et al. | 356/138 |
| 3,619,069 | 11/1971 | Alexander | 356/138 |
| 3,734,627 | 5/1973 | Edwards | 356/399 |
| 3,895,854 | 7/1975 | Ziffer | 350/171 |
| 3,914,787 | 10/1975 | Sekiguchi | 350/171 |

FOREIGN PATENT DOCUMENTS

| | | | |
|---|---|---|---|
| 2026502 | 9/1972 | France . | |
| 2384274 | 11/1978 | France | 356/138 |
| 1603144 | 11/1981 | United Kingdom . | |

OTHER PUBLICATIONS

H. L. Gelernter et al., "Dual Spot...", *IBM Tech. Disc. Bull.*, vol. 5, No. 5, Oct. 1962, p. 79.

Primary Examiner—Jon W. Henry
Attorney, Agent, or Firm—Marc D. Schechter

[57] ABSTRACT

A collimator for coordinating two optical devices which operate in different wavelength. The collimator regions comprises a source hole formed in a plane mirror. The source hole is illuminated by a source which emits light in two wavelength regions. The source is arranged in the focus of a mirror collimator. The beam which emerges from the collimator after reflection from the mirror forms a first parallel radiation beam having wavelengths in one of the wavelength regions. After passing through a plate with substantially parallel surfaces and a wedge compensator, the beam forms a second parallel radiation beam having wavelengths in the other region. The beams have the same axial spacing as the two optical devices and are made exactly parallel to each other by the wedge compensator.

7 Claims, 1 Drawing Figure

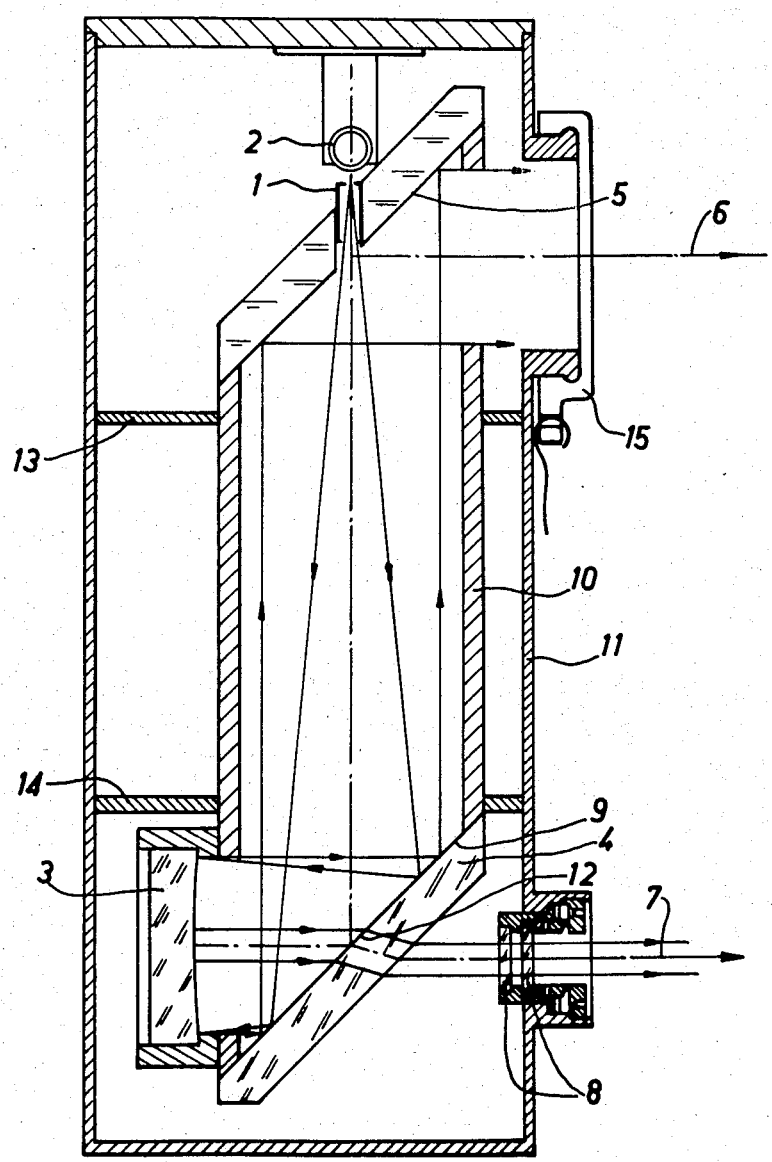

COLLIMATOR FOR COORDINATING TWO OPTICAL DEVICES

BACKGROUND OF THE INVENTION

The invention relates to a collimator for coordinating two optical devices which operate in different wavelength regions.

Known devices of this type include autocollimator telescopes used in the visible wavelength region, and collimators for controlling infrared cameras such as Newton-type collimators. French Pat. No. 2,026,502 describes another type of collimator. This latter collimator can operate in two wavelength regions by using a spectrum-separating layer on the reticle.

SUMMARY OF THE INVENTION

It is an object of the invention to provide a collimator for both controlling and adjusting the coordination between two devices, for example a visible light telescope and an infrared camera.

A collimator according to the invention comprises means for forming a first parallel radiation beam in one of the wavelength regions and a second parallel radiation beam in the other wavelength region. The beams are derived from a primary beam emerging from a source emitting light in the two wavelength regions. The spacing between the axes of the parallel radiation beams is identical to that between the axes of the optical devices.

BRIEF DESCRIPTION OF THE DRAWING

The drawing schematically shows a collimator according to the invention.

DESCRIPTION OF THE PREFERRED EMBODIMENTS

The collimator shown in the drawing has a source hole (opening) 1 formed in the center of a plane mirror 5. Source hole 1 is disposed at an angle of 45° to the normal to the mirror.

Hole 1 is illuminated by a source 2. Source 2 emits visible and infrared light to form a primary beam. The primary beam has an optical axis which is at 45° to the plane mirror 5. Source 2 is situated at the focus of a mirror collimator.

The mirror collimator is a concave mirror 3 and a plate 4 having substantially parallel surfaces. The surface 9 of plate 4 is exposed to the light from the source. Surface 9 is metallized, except for an opening in the central area 12, where the plate is semitransparent. The parallel surfaces of plate 4 are substantially parallel to the plane mirror 5, and are inclined at an angle of 45° to the axis of the concave mirror.

In operation, the beam of visible and infrared light emerging from the source hole 1 is reflected by the plate 4 and by the concave mirror 3. Part of the beam is again reflected by the plate 4, and finally by the plane mirror 5. As a result, a parallel light beam 6 of visible and infrared radiation emerges from the collimater.

After reflection from concave mirror 3, part of the beam passes through the semitransparent central area 12 of the plate 4. Plate 4 is made of a material (for example glass) which filters the infrared light. After passing through area 12 of plate 4, the light passes through a wedge compensator 8 to form a parallel light beam 7. Beam 7 contains only visible radiation.

Errors in the parallelism of the two surfaces of the plate 4, and of the plate 4 relative to the plane mirror 5 are compensated by the wedge compensator 8. By using compensator 8, the beams 6 and 7 can be made exactly parallel during manufacture of the device.

The mirrors 3 and 4 and the plane mirror 5 are rigidly mounted on a tube 10. The materials of these four elements are selected so as to obtain equal or substantially equal coefficients of expansion.

The tube 10 is suspended inside a casing 11. Casing 11 protects the mirrors against external stresses and rapid temperature variations. The suspension is represented by the reference numerals 13 and 14. The casing 11 also supports the source 2 and the wedge compensator 8.

The source 2 is, for example, a low power halogen lamp. The filament of the lamp is the visible light source and the envelope is the infrared source.

The housing 11 is closed with a removable shutter 15. Shutter 15 is arranged in the path of the parallel light beam 6. This shutter may be replaced with a fixed window of a material which is transparent to the infrared light or which is transparent to visible and infrared light (for example ZnS). With the latter, the collimator can be adjusted in the visible spectrum.

If the wedge compensator 8 is replaced with a slightly prismatic window, and if the window 15 is replaced with another slightly prismatic window having the same angle as the first window, the beams 6 and 7 can be made parallel by the two windows in combination.

The main properties of this collimator are as follows. First, the two light beams are maintained parallel under severe environmental conditions (temperature extremes, shocks, and vibrations). Second, the system is compact, light in weight and easy to construct.

What is claimed is:

1. A collimator for coordinating two optical devices which operate in different wavelength regions, said collimator comprising:
   a radiation source emitting radiation in two wavelength regions;
   a plane mirror with an opening therein, said opening being arranged in front of the radiation source so as to define a primary beam having an optical axis, the plane mirror being arranged at an acute angle x with respect to the primary beam optical axis;
   a plate arranged on the optical axis in front of the plane mirror, said plate having two substantially parallel surfaces, said plate being arranged at an acute angle y with respect to the primary beam optical axis;
   a reflective layer on one parallel surface of the plate, said reflective layer having an opening therein;
   a concave mirror arranged in front of the plate on a secondary beam optical axis, said secondary beam optical axis coinciding with the reflection of the primary beam axis by the plate, said concave mirror having a focus on the primary beam optical axis at the opening in the plane mirror; and
   a compensator arranged behind the plate to receive radiation from the concave mirror which passes through the opening in the reflective layer.

2. A collimator as claimed in claim 1, characterized in that x equals y.

3. A collimator as claimed in claim 2, characterized in that x equals 45° and y equals 45°.

4. A collimator as claimed in claim 3, characterized in that the plate is semitransparent in at least one radiation region.

5. A collimator as claimed in claim 4, characterized in that the plane mirror, the plate, and the concave mirror are rigidly mounted in a tube, said plane mirror, plate, concave mirror and tube having substantially equal coefficients of thermal expansion.

6. A collimator as claimed in claim 5, characterized in that the collimator further comprises a casing for supporting the tube, the radiation source, and the compensator.

7. A collimator as claimed in claim 6, characterized in that the compensator is a wedge compensator.

* * * * *